Feb. 7, 1939.  E. J. CONRAD  2,146,108
DEVICE FOR MAKING INFUSIONS OR DECOCTIONS
Filed July 22, 1937
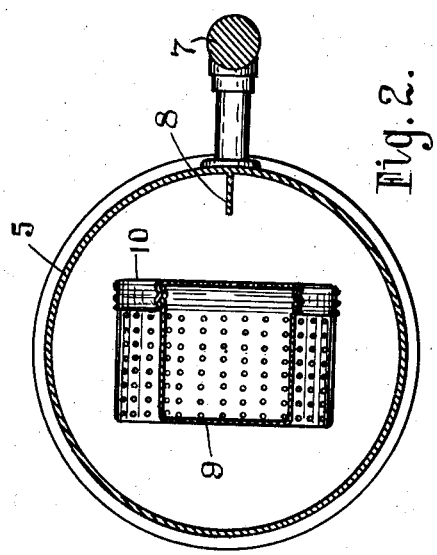
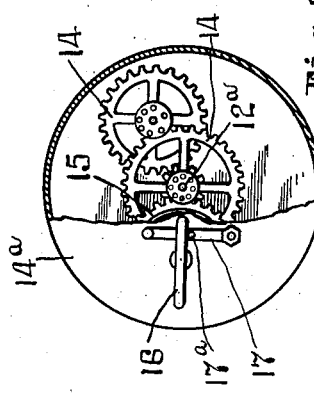
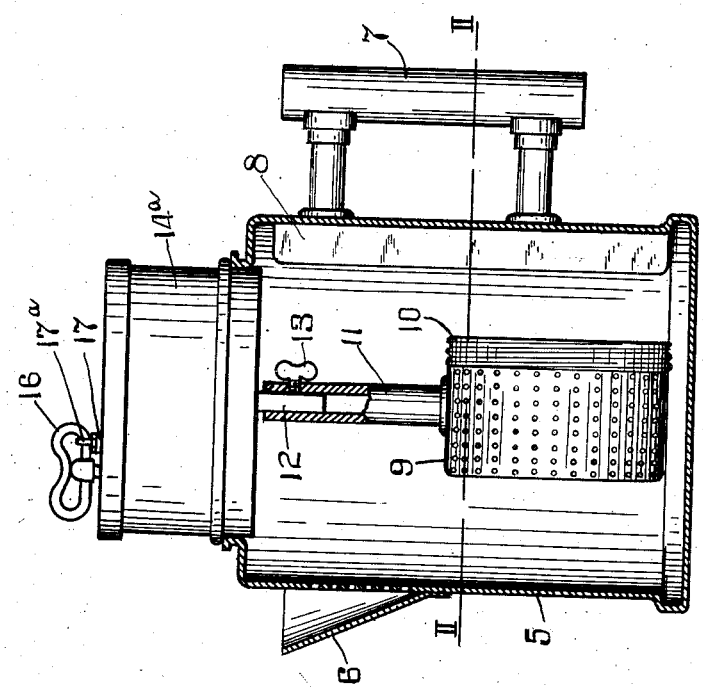
Inventor
EUGENE J. CONRAD
By Finckel & Finckel
Attorneys Patented Feb. 7, 1939

2,146,108

UNITED STATES PATENT OFFICE

2,146,108

DEVICE FOR MAKING INFUSIONS OR DECOCTIONS

Eugene J. Conrad, Columbus, Ohio

Application July 22, 1937, Serial No. 155,074

2 Claims. (Cl. 53—3)

This invention relates to means and mechanism for producing an infusion or decoction, especially of coffee and has for its main object to provide a simple and economical construction for use in the home. A further object is to provide means in the coffee pot cooperating with the operation of the ground coffee container whereby a swirling and other motions of the hot water are set up and the infusion or decoction more rapidly and satisfactorily accomplished than heretofore. An object incident to the foregoing is to provide improved means whereby the period of motion of the coffee container in the water supply can be limited to a given period. Other objects will appear from the disclosure herein.

The invention is embodied in the example herein shown and described the features of novelty being finally claimed.

In the accompanying drawing—

Figure 1 is a vertical sectional view of the means, parts being in full according to the invention.

Fig. 2 is a horizontal sectional view on the line II—II Fig. 1, looking down.

Fig. 3 is a top plan view of the case or housing constituting the pot cover, the same being in partial section exhibiting a motor mechanism for rotating the ground coffee container.

In the views, 5 designates the pot, it having an ordinary pouring spout 6 and a handle 7. Secured vertically to the interior wall of the pot is a fin or baffle 8.

The character 9 designates the body of the coffee container it consisting of a cylindrical box-like structure of sheet metal having its walls perforated, except at the rim of the opening thereto which rim is threaded to receive a cover 10 threaded at its rim, as best shown in Fig. 2. The unthreaded wall portion of the cover is also perforated, as indicated in said Fig. 2.

The said container has secured to its cylindrical or tubular wall a stem 11 tubular at its upper end to removably receive the driven shaft 12 of a spring motor mechanism, said shaft 12 being flattened at one side to be pinched by a set screw 13 in order to hold the container for rotation by the driven shaft in the operating position slightly above the bottom of the pot.

The spring motor indicated in Fig. 3 is of ordinary or suitable form and is mounted in a suitable case 14a that constitutes the cover for the pot. In the instance shown the motor includes a gear train 14 and a volute spring 15, the latter adapted to be wound up to the extent desired by a finger piece 16 and released at will to cause the rotation of the shaft 12 and container. In practice the period of such rotation may be, say for three minutes, more or less, according to the desired strength of the decoction and the degree of grind of the coffee when the container and its contents are rotated in the hot water.

The character 17 designates a lever having thereon a stop pin 17a, said lever pivoted to the gear train case 14a for arresting by the contact of the finger piece 16 therewith and therefore the rotation of the driving mechanism and the coffee container. The stop lever can be swung on its pivot to prevent the operation of or release for operation the wound up spring or to arrest the exertion of power at will. The upper end of the shaft 12 is secured as a reduced portion 12a in the pinion of the gear train.

In practice the case for the motor mechanism together with the coffee container attached thereto as depicted in Fig. 1 is removed from the pot and then the screw cover of the container removed to permit the supplying of the ground coffee to the container after which the said screw cover is reapplied and the coffee container and the case of the motor mechanism reinserted in the pot, the latter having been first supplied with the desired quantity of hot water or sufficient to submerge the coffee container.

Prior to such submergence of the coffee container the spring of the motor should be wound up to the extent desired and latched.

Promptly after the insertion of the coffee container into the hot water of the pot the power of the spring is released by shifting the stop lever 17 to cause the rotation of the container which rotation can continue until the spring is entirely relaxed. Full wind of the spring is preferably adapted to produce a strong infusion. If a weaker infusion is desired the operation of the spring can be partially wound or arrested in a shorter time determined by looking at a time piece. Of course, the quantity of ground coffee put in the container can be varied to make the infusion weak or strong.

Due to the fact that the shaft 11 extends in a plane parallel to the plane of the two flat faces of the container a broadly horizontal swirl of the water in the pot is set up and this swirl of water impinging against the vertical fin 8 is thereby caused to rise and fall within the pot imparting to the water an artificial or mechanical boiling effect and without the use of boiling water. I find that the best infusion is obtained by making it in hot water but not boiling because in this way important volatile elements of the coffee are not driven off. Hence, with my construction the hot water tends to penetrate the perforations of the container and the grounds therein from all directions. It may be further noted I have found that where the volatile elements and aroma of the coffee are not driven off as by boiling the water the infusion is better preserved, and it is well known that an ordinary left over boiled water infusion of coffee is practically unpalatable as compared with an infusion immediately made and used. However if the user prefers to use heat to boil the water while rotating in the container that will be practicable.

It is obvious that instead of a spring actuated motor an electrically operated motor can be employed where the required electric current is available.

The forms and sizes of the parts can be changed without departing from the gist of the invention as claimed.

What I claim is:

1. In an infusion making means such as described, including a container for water and a removable cover therefor, a perforated receptacle for the material from which the infusion is to be made, said perforated receptacle being a tubular portion closed with substantially flat ends extending in vertical planes, and a vertical rotatable shaft connected with said receptacle between said vertical ends, said water container having fixed therein to the wall thereof a substantially vertical breaker rib, whereby when said receptacle is rotated water in said container has imparted to it by said ends and breaker a swirling and rising and falling movement.

2. In an infusion making means such as described, including a container for water and a removable cover therefor, a perforated receptacle for the material from which the infusion is to be made, said perforated receptacle being a tubular portion closed with substantially flat ends extending in vertical planes, one of said ends constituting a removable cover, and a vertical rotatable shaft connected with said receptacle between said vertical ends, said water container having fixed therein to the wall thereof a substantially vertical breaker rib, whereby when said receptacle is rotated water in said container has imparted to it by said ends and breaker a swirling and rising and falling movement.

EUGENE J. CONRAD.